United States Patent [19]

Menke et al.

[11] Patent Number: 4,543,622
[45] Date of Patent: Sep. 24, 1985

[54] LIGHT BAR FOR EMERGENCY VEHICLES

[75] Inventors: W. Kenneth Menke, Glendale; Danny C. Jincks, Annapolis, both of Mo.

[73] Assignee: Public Safety Equipment, Inc., St. Louis, Mo.

[21] Appl. No.: 657,493

[22] Filed: Oct. 4, 1984

[51] Int. Cl.[4] .............................................. B60Q 1/46
[52] U.S. Cl. .................. 362/219; 340/81 R; 340/87; 362/223; 362/238; 362/240; 362/243
[58] Field of Search ................. 362/61, 217, 219, 222, 362/223, 224, 236-241, 243, 307, 363, 367; 340/81 R, 84, 87

[56] References Cited

U.S. PATENT DOCUMENTS

| 4,189,709 | 2/1980 | Gosswiller | 362/367 X |
| 4,224,599 | 9/1980 | Peirish, Jr. et al. | 340/84 |
| 4,240,062 | 12/1980 | Gosswiller | 340/87 X |
| 4,357,595 | 11/1982 | Gosswiller | 340/87 X |

Primary Examiner—Tony M. Argenbright
Attorney, Agent, or Firm—Senniger, Powers, Leavitt and Roedel

[57] ABSTRACT

A light bar for emergency vehicles, comprising a relatively thin flat elongate base adapted for mounting thereon a plurality of electrical and mechanical components such as lamps, a siren and the circuitry therefor and an array of holes in the base extending lengthwise of the base adapted to receive fasteners for mounting the components on the base. The holes are of such number and so arrayed as to accommodate any one of a multiplicity of component configurations. The light bar further comprises sealing means extending lengthwise of the base over the holes for sealing the holes and a plurality of fasteners threadable through the sealing means into specific holes in the array of holes for fastening selected components to the base in a predetermined configuration. The other holes in the array remain sealed by the sealing means.

39 Claims, 9 Drawing Figures

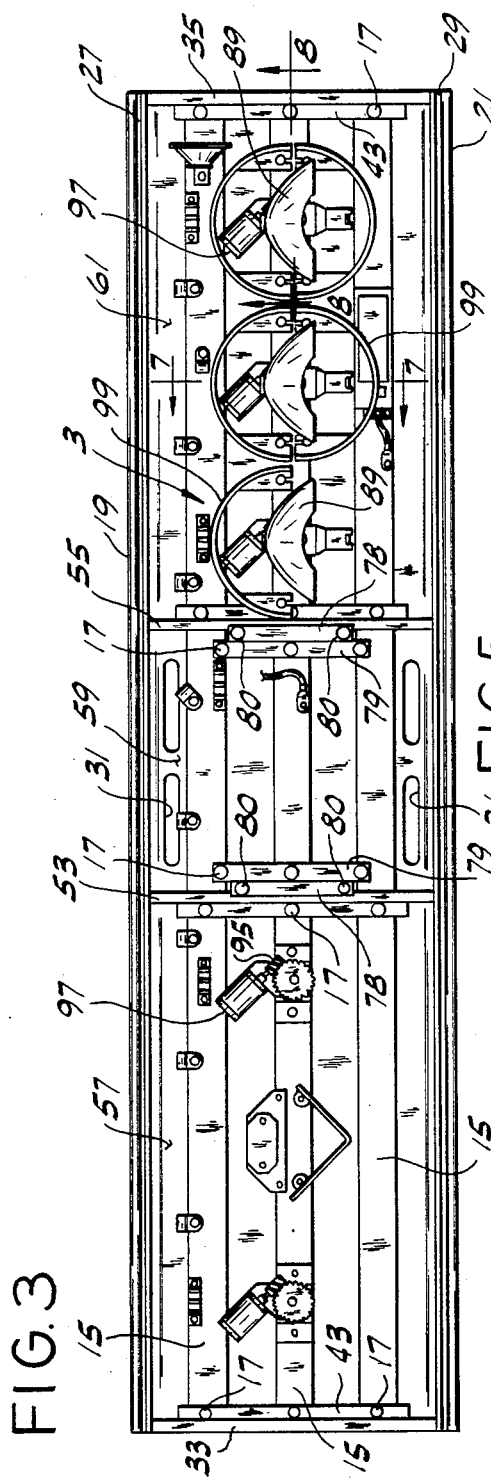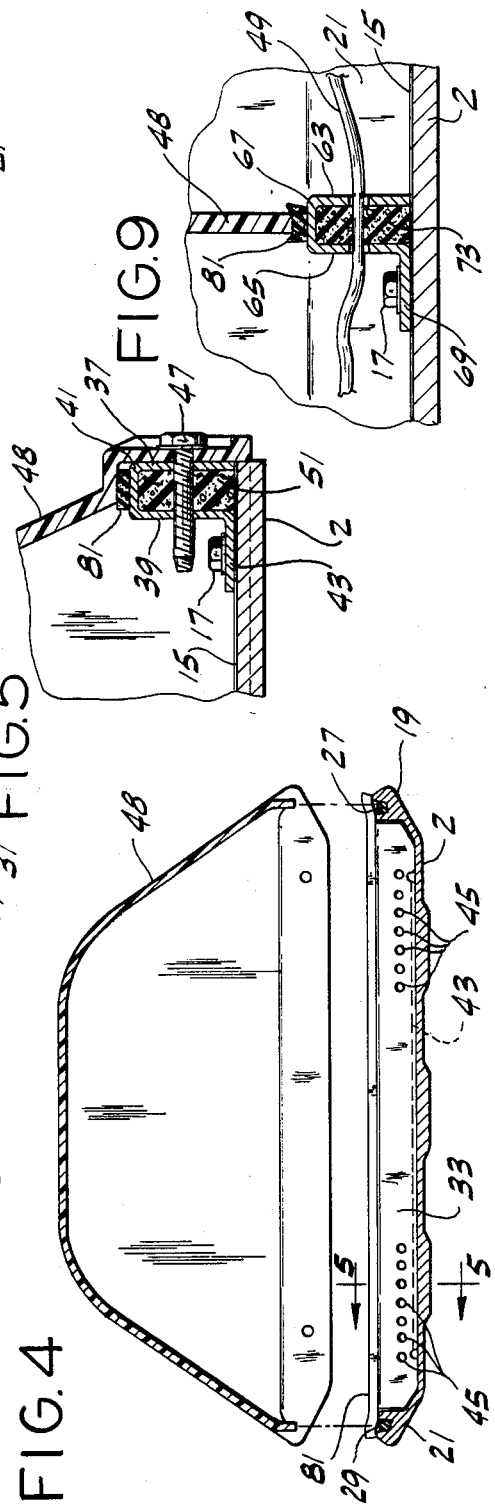

U.S. Patent  Sep. 24, 1985  Sheet 3 of 3  4,543,622

LIGHT BAR FOR EMERGENCY VEHICLES

BACKGROUND OF THE INVENTION

This invention relates generally to light bars for emergency vehicles and, more particularly to the construction of a light bar capable of accommodating a multiplicity of component configurations and the method of making such a light bar.

Light bars are utilized on many different types of vehicles such as police cars, ambulances, wreckers, etc. to give visual indications of their presence during emergencies. Light bars typically include a variety of different components such as stationary lamps, rotating lamps, reflectors, and a siren. The dome of a light bar is normally tinted to impart the desired color, typically red, blue or yellow, to the light emitted. If it is desired to emit light of different colors from different lamps, a colorless dome is used and lenses of the desired colors are placed on the various lamps.

The components typically vary in size and configuration, with a consequent variation in the pattern of holes in their respective supports for receiving the fasteners used to attach them to the base of the light bar. Thus, the base is punched with a particular array of holes used to accommodate a particular arrangement of components in the bar, the holes in each location along the base corresponding uniquely to the fastener holes in the component to be mounted at that location.

As a result, the array of holes in the base necessarily varies as the arrangement of components in the bar is varied. This is a practical problem because the desired arrangement of components varies from jurisdiction to jurisdiction, and sometimes from vehicle to vehicle in a particular jurisdiction. A resultant complication and expense is, thus, introduced into the process of manufacturing light bars, since bases must be custom punched for each desired component arrangement.

A further complication in both the manufacture and use of light bars arises from the variation in light color requirements as a function of the particular use to which the light bar is put. Thus, for example, some jurisdictions require one color light for fire vehicles, another for police vehicles, and still others for ambulances and maintenance vehicles. Although the light bars may otherwise be standardized and interchangeable among vehicles of different types, the color limitations may require dedication of a particular light bar to a single use. Economies in the purchase and utilization of light bars could be achieved if means were provided for simple modification of the bar to change the color of light projected from its lamps.

Some codes and practices further require that light of one color be projected forwardly of an emergency vehicle and light of another color be projected to the rear. Meeting such requirements may present difficulty where color is imparted to the projected light by placement of a colored lens over the lamps mounted inside the bar.

SUMMARY OF THE INVENTION

Among the several objects of this invention may be noted the provision of a light bar for emergency vehicles which can be utilized for a variety of emergency vehicles; the provision of such a light bar which has the flexibility of accommodating various component configurations; the provision of such a light bar which permits interchangeability of parts for different types of emergency vehicles; the provision of such a light bar which is simple in construction, and which permits installation and component arrangement to be completed easily and economically; the provision of a light bar which is subject to simple modification to change the color of the light projected from it; the provision of a light bar from which light of different colors can be projected in different directions; and the provision of an efficient method for making such a light bar.

In general, a light bar of this invention is for emergency vehicles and comprises a relatively thin flat elongate base adapted for mounting thereon a plurality of electrical and mechanical components such as lamps, a siren and the circuitry therefor, and an array of holes in the base extending lengthwise of the base adapted to receive fasteners for mounting the components on the base. The holes are of such number and so arrayed as to accommodate any one of a multiplicity of component configurations. Sealing means is provided on the base over the holes for sealing the holes. A plurality of fasteners are threadable through the sealing means into specific holes in the array of holes for fastening selected components to the base in a predetermined configuration. The other holes in the array remain sealed by the sealing means.

The method of making this invention for emergency vehicles comprises the steps of providing an array of holes in the base extending lengthwise of the base, the holes being of such number and so arrayed as to accommodate any one of a multiplicity of component configurations, applying sealing means on the base over the holes to seal the holes, and mounting selected components on the base by threading a plurality of fasteners through the sealing means into specific holes in the array of holes for fastening the selected components to the base in a predetermined configuration, the other holes in the array remaining sealed by the sealing means.

Other objects and features will be in part apparent and in part pointed out hereinafter.

BRIEF DESCRIPTION OF THE DRAWINGS

FIG. 3 is similar to FIG. 2 with an assortment of lamps and other components in place;

FIG. 4 is an enlarged vertical section through the light bar showing an end wall of the invention, the dome of the light bar being exploded away from the base of the light bar for clarity;

FIG. 5 is an enlarged vertical section on line 5—5 of FIG. 4;

FIG. 9 is an enlarged partial cross-section of a bulkhead with a wire passing therethrough.

Corresponding reference characters indicate corresponding parts throughout the several views of the drawings.

DESCRIPTION OF THE PREFERRED EMBODIMENT

Figure 1:
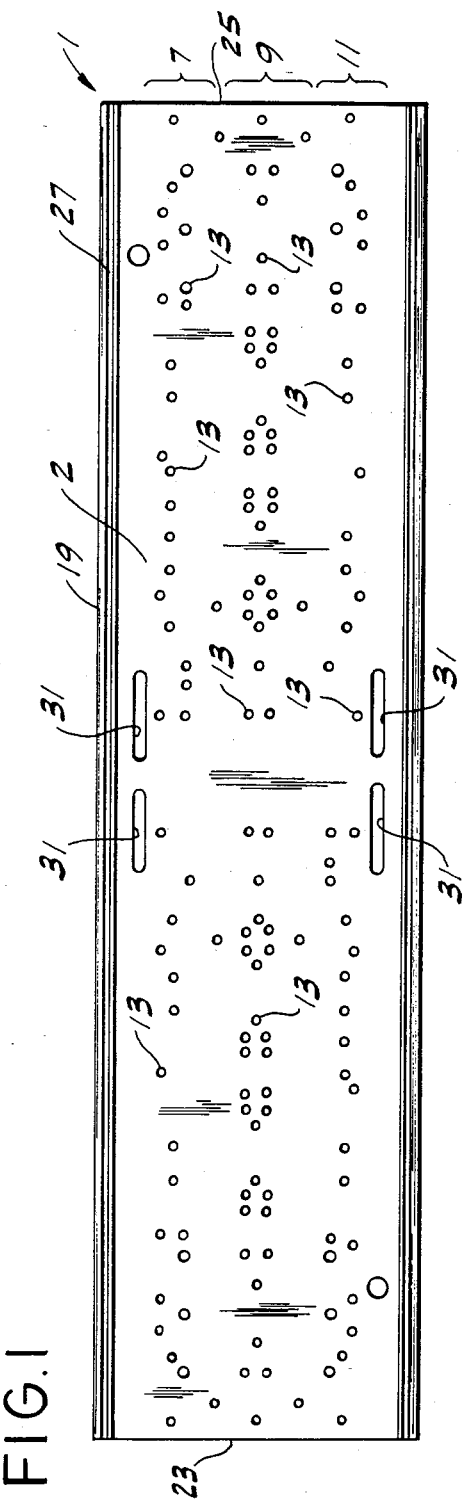
FIG. 1 is a top plan of a light bar of this invention with dome, lights and all circuitry removed.

Referring now to the drawings, a light bar of this invention is designed to be mounted on the roof of an emergency vehicle, such as a police car, and is shown as comprising a base 1 comprising a relatively thin flat elongate plate 2 having mounted thereon a plurality of electrical and mechanical components, such as lamps 3 and a siren 5 and the circuitry therefor (not shown). Each component comprises a support having a pattern of holes therein for receiving fasteners for attachment of the component to the plate. Because of variations in configuration of the components, the pattern of fastener holes also varies among the different componets.

Arrays 7, 9 and 11 of holes 13 are provided in plate 2 of the base extending lengthwise of the base. These holes are of such number and so arrayed as to accommodate, at discrete locations spaced along plate 2, a plurality of components having in varying patterns of fastener holes therein so that each hole in the component support is aligned with a hole in the base. Strips of sealing tape 15, constituting means for sealing the holes in the base, extend lengthwise of the base over the holes 13, and a plurality of fasteners 17 are threadable through the sealing tape into specific holes 13 for fastening selected components to the base 1 in virtually any predetermined configuration. Thus, any one of the components can be located at a variety of positions essentially anywhere along the base. The unused holes in the base array remain sealed by the sealing tape. The sealing tape may be of any suitable type, such as aluminum tape.

More particularly, the base 1 is constructed of a suitable lightweight and durable sheet material, such as aluminum, and is generally rectangular in shape with opposite sides 19, 21 and opposite ends 23, 25. Sides 19 and 21 are integrally formed with the plate of the base and extend upwardly thereabove. Each side 19 and 21 has a longitudinal groove 27 and 29, respectively, in its upper edge. As shown in FIG. 1, the base has three arrays of holes 7, 9 and 11 therein extending lengthwise of the base. It will be understood that the number of arrays (and the number of holes per array) can vary depending on the multiplicity of configurations desired and the type of components to be used. The arrays are spaced from one another transversely with respect to the base and are relatively narrow with respect to the width of the base. The base 1 further has a pair of elongate openings 31 therein extending along each side of the base, generally in the center of the base, for drainage of water as will be understood. As mentioned above, a strip of sealing tape 15 extends over the holes of each array to prevent dirt and moisture from entering up through the bottom of the base, as will be apparent.

Walls 33 and 35 are mounted at ends 23 and 25, respectively, of the base plate. These end walls are formed from elongate strips of metal, such as aluminum, and extend upwardly generally to the same height as the sides of the base. As illustrated in FIG. 5, the end walls are generally of inverted U-shape, each having an exterior vertical section 37, an interior vertical section 39 and an upper horizontal section 41. The interior section 39 has a flange 43 formed at its lower end having holes (not shown) therein aligned with holes 13 in the three arrays 7, 9, 11 of holes. The end walls 33, 35 are secured to the base by means of self-tapping screws 17 extending through the holes in flange 43 and sealing tape 15 and into holes 13 in the base. Each end wall has a series of holes 45 in its vertical sections 37 and 39, the holes in one section being generally in alignment with the holes in the other section for the passage of a screw 47 for mounting a dome 48 on the light bar or wire 49 therethrough. A closed-cell foam (e.g., neoprene foam) strip 51 is compressed between sections 37, 39 and the face of the base plate 2 between the sections to provide a sealing fit when the end walls 33, 35 are secured to the base in order to prevent moisture and dirt from entering the light bar.

The foam of strip 51 is sufficiently soft to permit penetration therethrough of a screw or wire and sufficiently resilient to seal therearound after penetration. A particularly suitable foam is that whose cell walls are constituted of a blend of ethylene/propylene terpolymer rubber, polyethylene and butyl rubber, and which is sold under the trade designation "R-4993-T" by Rubatex. Generally it is preferred that the foam material have an elongation of 100–250% and a hardness of 35–55 as measured by a Shore 00 durometer.

Figure 2:
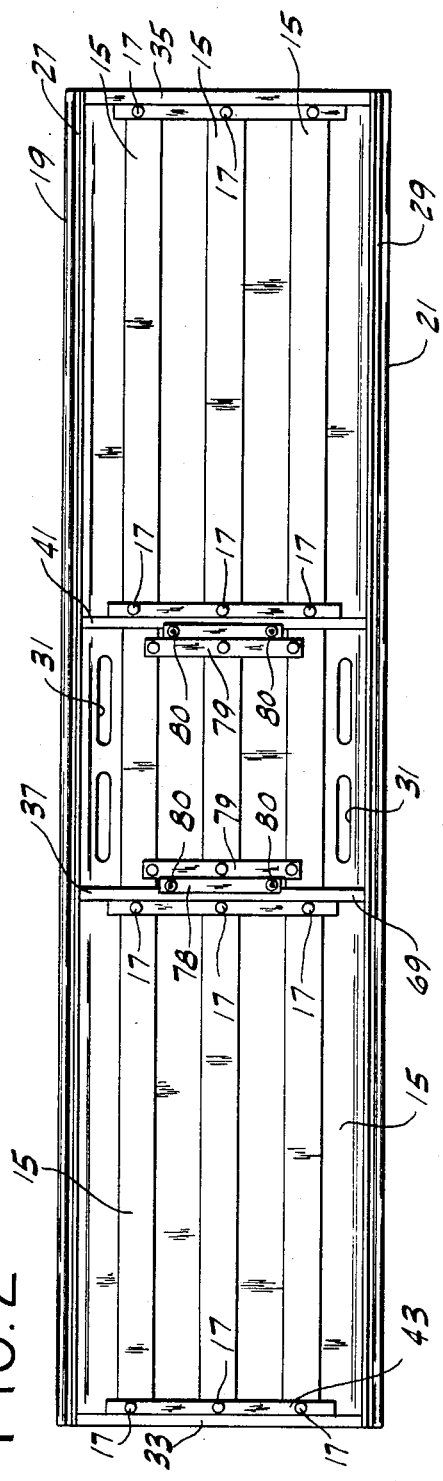
FIG. 2 is similar to FIG. 1 but showing sealing tape, bulkheads and mountings for the dome in place.

As best illustrated in FIGS. 2 and 3, two bulkheads 53 and 55 are fastened to the base 1 thereby dividing the base into three compartments 57, 59 and 61. Like end walls 33 and 35, the bulkheads extend transversely with respect to the base from one side of the base to the other and upwardly generally to the same height as sides 19 and 21. The bulkheads are generally elongate and of inverted U-shape, each having generally parallel spaced-apart vertical side walls 63 and 65 and a horizontal upper wall 67. One wall 65, the outside wall as shown, has a flange 69 at its lower end with three holes (not shown) therein for attachment to the base by self-tapping screws 17. A sealing member 71 is compressed between the walls 63 and 65 of each bulkhead and the upper face of plate 2 within the walls to prevent any dirt or moisture from entering a respective compartment, as will be understood. Like end walls 33 and 35, there is a first series of holes (not shown) in one wall of each bulkhead and a second series of holes (not shown) in the other wall of the bulkhead. Each hole in the first series is generally aligned with a corresponding hole in the second series to permit passage of a wire 49 through the bulkhead via the aligned holes (FIG. 9). It will be understood that the series of holes in each wall is provided to accommodate any number of wires up to a maximum corresponding to the number of holes in a series. The sealing member 73 is made of a closed-cell foam, such as neoprene foam of the type described hereinabove. The foam is sufficiently soft to permit penetration of a wire through the member and sufficiently resilient to seal around the wire after penetration whereby a wire may be passed through the bulkhead by inserting the wire through a hole in the first series and then pushing the wire through the sealing member and then through the corresponding aligned hole in the second series. The sealing member 73 seals around the wire to prevent the passage of moisture and the like through the bulkhead.

Mounts 75 for mounting domes 48 on the base 1 over compartments 57, 59 and 61 are securely fastened to the base along the inside of the bulkheads 53 and 55. The mounts extend upwardly from the base and each has at its lower end a flange 79 similar to flanges 43 of end walls 33 and 35 and to flanges 69 of bulkheads 53 and 55. A horizontal flange 78 at the upper end of each mount 75 supports two screw receiving anchors 80 for securely holding the domes 48 in position as will be understood by those familiar in the art.

As seen in the drawings, sealing strips 81 are secured in grooves 27 and 29 in the sides 19 and 21 of the base 1 of the light bar, along the upper sections 41 of end walls 33 and 35 of the base 1, and along the top of each bulkhead 53 and 55. These strips prevent water, dirt and other foreign substances from entering the light bar when the domes 48 are mounted on the base.

Figure 6:
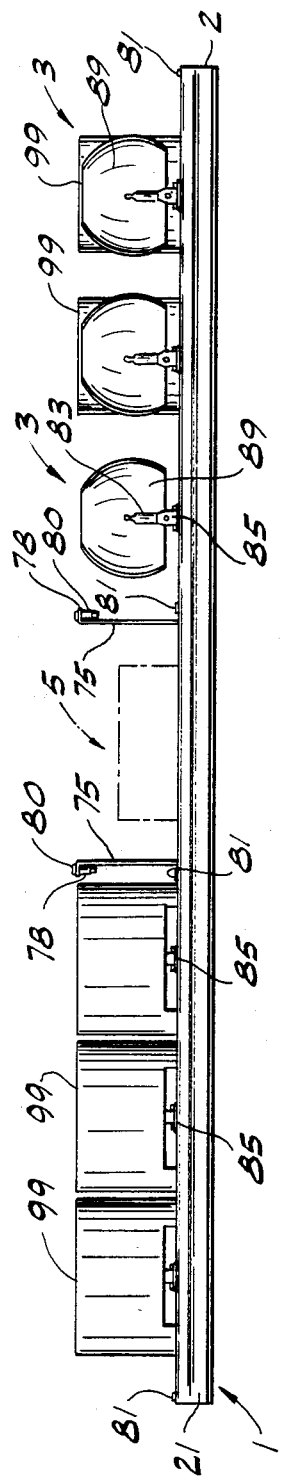
FIG. 6 is a front view of this invention showing a variety of lamp configurations.
Figure 8:
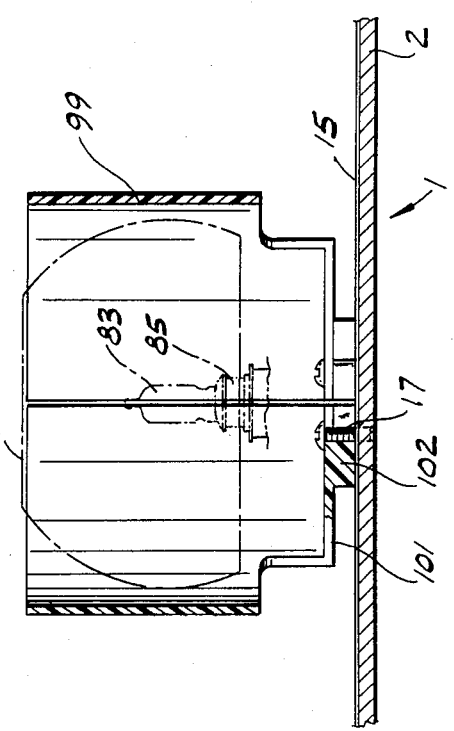
FIG. 8 is a vertical section on line 8—8 of FIG. 3.
Figure 7:
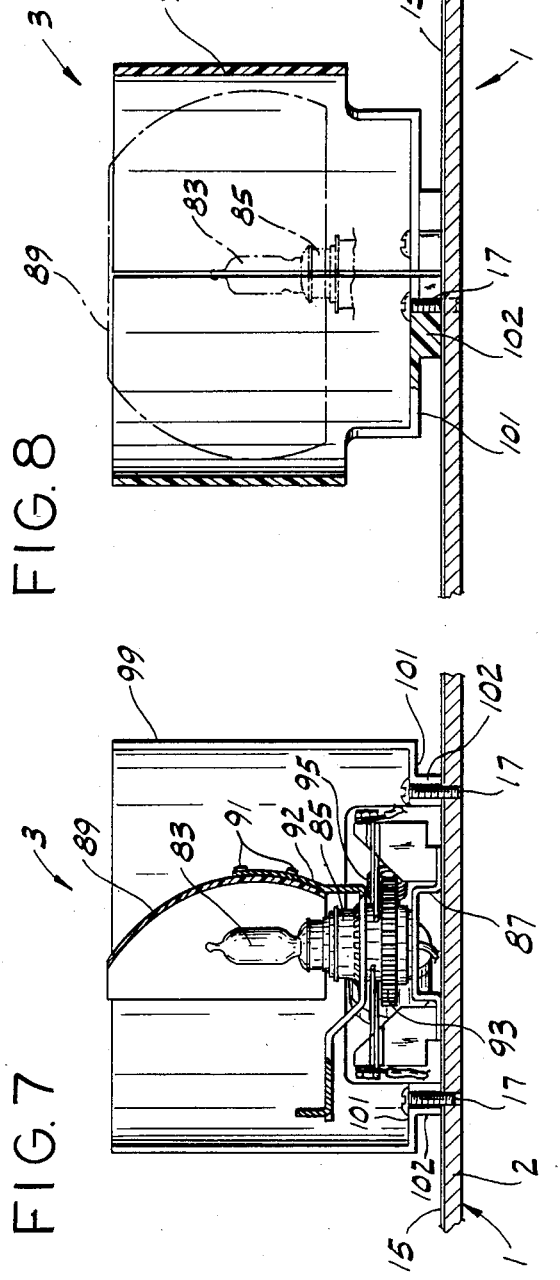
FIG. 7 is a vertical section on line 7—7 of FIG. 3 with the lamp rotated 90°.

As seen in FIGS. 3 and 6, a plurality of components (e.g., lamps 3) can be fastened to the base 1 of the light bar. For example, a series of lamps, each designated generally at 3, may be mounted in each of the two outer compartments 57, 61 and a siren 5 may be mounted in the central compartment 59. Each lamp 3 is shown as having an electric lightbulb 83 seated in a base 85 which is affixed to a base bracket 87. The base bracket has an inverted U-shape and is mounted on the base 1 of the light bar by means of self-tapping screws 17 threaded through holes in a respective array of holes. A silvered metal concave mirror 89 is attached by a pair of rivets 91 to a support bracket 92 secured to the base 85. The light is rotated by means of a toothed gear 93 in combination with a worm gear 95 which is driven by a motor 97 (see FIG. 3).

In conjunction with the lamp, a stationary filter 99 is attached to the base 1 of the light bar by fasteners 17 inserted in holes in a respective array of holes. Filter 99 is spaced laterally from lamp 3 with respect to base 1, and is positioned either rearwardly or forwardly of the lamp with respect to a vehicle when the light bar is attached to the vehicle transversely of the vehicle's longitudinal axis. The filter is comprised of transparent material tinted with a color to be imparted to light from the lamp, so that light of such color is projected either rearwardly or forwardly of a vehicle to which the bar is transversely attached. The filter is removably attached to the base and comprises a modular unit that it is interchangeable with other filters of the same or different color, and is thus adapted to accommodate lamps of different configuration that are attached to the base. More particularly, the filter is generally semi-cylindric in shape and is mounted with its longitudinal axis (axis of curvature) generally vertical. It has a first radial flange 101 at its lower end and a second vertical flange 102 at the periphery of the first flange for mounting of the filter on the base 1 via a suitable fastener such as a self-tapping screw 17. The filter can be of any desired color.

Because of the ready removability of the filter and its interchangeability with filters of different colors, the present invention provides for simple and easy modification of a light bar to change the color of light projected from a particular lamp mounted on a particular bar. When filters of a desired range of colors are used in conjunction with a clear colorless dome, a particular light bar may be readily utilized on a variety of different types of vehicles with a minimum of conversion time. Moreover, by attaching a second transparent modular filter to the base spaced laterally of the lamp on the side thereof opposite the first filter, a light bar may be set up to project light of one color forwardly of a vehicle and the light of another color rearwardly thereof.

The method of this invention of making a light bar for emergency vehicles, such as police cars, comprises providing arrays 7, 9 and 11 of holes 13 in the base 1 extending lengthwise of the base. The holes are of such number and so arrayed as to accommodate any one of a multiplicity of component configurations. Next, strips of sealing tape 15 are applied along the base over the holes 13 in order to seal the holes. End walls 33 and 35, bulkheads 53 and 55 and dome mounts 75 are fastened to the base of the light bar by means of self-tapping screws 17 threaded into specific holes of the arrays. Sealing strips 81 are also secured in place in grooves 27 and 29, the upper sections 41 of end walls 33 and 35, and along the top of bulkheads 53 and 55. Selected components are mounted on the base by threading fasteners, such as self-tapping screws 17, through the sealing tape into specific holes in the arrays 7, 9 and 11 of holes for fastening the selected components to the base of the light bar in a predetermined configuration. The other holes 13 in the arrays remain sealed by the strips of sealing tape 15 in order to keep dirt and moisture from entering the light bar through the base. Domes 48 are then mounted on the light bar to seal the light bar.

It will be understood from the foregoing that the light bar of this invention permits custom designing of the bar to meet the specific requirements of the user at low cost and permits the addition of special features either at the time of initial manufacture, at the time of sale to the customer, or at some later date when the user's requirements have changed.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A light bar for emergency vehicles comprising a relatively thin flat elongate base adapted for mounting thereon a plurality of electrical and mechanical components such as lamps, a siren and the circuitry therefor, an array of holes in the base extending lengthwise of the base adapted to receive fasteners for mounting said components on the base, said holes being of such number and so arrayed as to accommodate any one of a multiplicity of component configurations, sealing means on the base over the holes for sealing the holes, and a plurality of fasteners threadable through said sealing means into specific holes in said array of holes for fastening selected components to the base in a predetermined configuration, the other holes in the array remaining sealed by said sealing means.

2. A light bar as set forth in claim 1 wherein said sealing means comprises a strip of sealing tape.

3. A light bar as set forth in claim 2 wherein said fasteners are self-tapping screws.

4. A light bar as set forth in claim 3 wherein said base has a plurality of arrays of holes therein extending lengthwise of the base, said arrays being spaced from one another transversely with respect to said base.

5. A light bar as set forth in claim 4 wherein each array is a relatively narrow array with respect to the width of the base.

6. A light bar as set forth in claim 1 wherein said base has opposite sides and opposite ends and at least one bulkhead on the base extending transversely with respect to the base from one side of the base to the other, said bulkhead comprising generally parallel spaced-apart walls having a sealing member therebetween, said sealing member having a sealing fit with the base and with said bulkhead walls, a first series of holes in one wall and a second series of holes in the other wall, each hole in the first series being generally aligned with a corresponding hole in the second series to permit passage of a wire through the bulkhead via said aligned holes, a series of holes in each wall being provided to accommodate any number wires up to a maximum corresponding to the number of holes in a series, said sealing member being sufficiently soft to permit penetration of a wire through the member and sufficiently resilient to seal around the wire after penetration, whereby a wire may be passed through the bulkhead by inserting the wire through a hole in said first series and then pushing the wire through the sealing member and through the corresponding aligned hole in the second series, said sealing member being adapted to seal around the wire to prevent the passage of moisture and the like through the bulkhead.

7. A light bar as set forth in claim 6 wherein said sealing member comprises a closed-cell foam having a Shore 00 durometer in the range of 35–55 and an elongation of 100–250%.

8. A light bar as set forth in claim 6 wherein said foam is compressed between the walls of the bulkhead to provide a sealing fit between the foam and the walls.

9. A light bar as set forth in claim 8 wherein said bulkhead comprises an elongate member of inverted-U shape.

10. A light bar as set forth in claim 1 further comprising, in combination with a lamp, a colored filter adapted for attachment to the base by at least one fastener receivable in a hole in said array of holes.

11. A light bar as set forth in claim 10 wherein said filter is generally semi-cylindric in shape and is adapted to be mounted with its longitudinal axis generally vertical, said filter having a radial flange at its lower end for mounting of the filter on the base via said fastener.

12. A light bar as set forth in claim 11 wherein said fastener is a self-tapping screw.

13. A light bar for emergency vehicles, such as police cars, comprising a relatively thin flat elongate base having opposite sides and opposite ends and being adapted for mounting thereon a plurality of electrical and mechanical components such as lamps, a siren and the circuitry therefor, at least one bulkhead on the base extending transversely with respect thereto from one side of the base to the other, said bulkhead comprising generally parallel spaced-apart walls having a sealing member therebetween, said sealing member having a sealing fit with the base and with said bulkhead walls, a first series of holes in one wall and a second series of holes in the other wall, each hole in the first series being generally aligned with a corresponding hole in the second series to permit passage of a wire through the bulkhead via said aligned holes, a series of holes in each wall being provided to accommodate any number wires up to a maximum corresponding to the number of holes in a series, said sealing member being sufficiently soft to permit penetration of a wire through the member and sufficiently resilient to seal around the wire after penetration whereby a wire may be passed through the bulkhead by inserting the wire through a hole in said first series and then pushing the wire through the sealing member and through the corresponding aligned hole in the second series, said sealing member being adapted to seal around the wire to prevent the passage of moisture and the like through the bulkhead.

14. A light bar as set forth in claim 13 wherein said sealing member comprises a closed-cell foam having a Shore 00 durometer in the range of 35–55 and an elongation of 100–250%.

15. A light bar as set forth in claim 14 wherein said foam is compressed between the walls of the bulkhead to provide a sealing fit between the foam and the walls.

16. A light bar as set forth in claim 15 wherein said bulkhead comprises an elongate member of inverted-U shape.

17. A light bar as set forth in claim 13 further comprising an array of holes in the base extending lengthwise of the base adapted to receive fasteners for mounting said components on the base, said holes being so numbered and arrayed as to accommodate any one of a multiplicity of component configurations, sealing means extending lengthwise of the base over the holes for sealing the holes, and a plurality of fasteners threadable through said sealing means into specific holes in said array of holes for fastening selected components to the base in a predetermined configuration, the other holes in the array remaining sealed by said sealing means.

18. A light bar as set forth in claim 17 wherein said sealing means comprises a strip of sealing tape.

19. A light bar as set forth in claim 18 wherein said fasteners are self-tapping screws.

20. A light bar as set forth in claim 17 further comprising, in combination with a lamp, a colored filter adapted for attachment to the base by at least one fastener receivable in a hole in said array of holes.

21. A light bar as set forth in claim 20 wherein said filter is generally semi-cylindric in shape and is adapted to be mounted with its longitudinal axis generally vertical, said filter having a radial flange at its lower end for mounting of the filter on the base via said fastener.

22. A base for an emergency vehicle light bar comprising a relatively thin, flat, elongate plate adapted for mounting thereon a plurality of electrical and mechanical components such as lamps, a siren and the circuitry therefor, an array of holes in the base adapted to receive fasteners for mounting said components on the base, said holes being of such number and so arrayed as to accomodate, at discrete locations spaced along said plate, a plurality of components having varying patterns of holes therein for receiving fasteners for attachment of the components to the base, said array being such as to permit mounting any particular one of said components at a variety of positions along the base and sealing means on at least one face of said plate over the holes for sealing the holes, whereby fasteners are threadable through said sealing means into select holes in said array for fastening selected components to the base in a predetermined configuration, the other holes in the array remaining sealed by said sealing means.

23. A light bar base as set forth in claim 22 wherein said sealing means comprises a strip of sealing tape.

24. A light bar base as set forth in claim 23 wherein said holes are adapted to receive self-tapping screws.

25. A light bar base as set forth in claim 24 having a plurality of arrays of holes therein extending lengthwise thereof, said arrays being spaced from one another transversely with respect to said plate.

26. A light bar base as set forth in claim 25 wherein each array is relatively narrow with respect to the width of the plate.

27. A light bar base as set forth in claim 22 having opposite sides and opposite ends and having at least one bulkhead thereon extending transversely with respect to said plate from one side to the other, said bulkhead comprising generally parallel spaced-apart walls having a sealing member therebetween, said sealing member having a sealing fit with said bulkhead walls and with the face of the plate between said bulkhead walls, a first series of holes in one wall and a second series of holes in the other wall, each hole in the first series being generally aligned with a corresponding hole in the second series to permit passage of a wire through the bulkhead via said aligned holes, a series of holes in each wall being provided to accommodate any number of wires up to a maximum corresponding to the number of holes in a series, said sealing member being sufficiently soft to permit penetration of a wire through the member and sufficiently resilient to seal around the wire after penetration, whereby a wire may be passed through the bulkhead by inserting the wire through a hole in said first series and then pushing the wire through the sealing member and through the corresponding aligned hole in the second series, said sealing member being adapted to seal around the wire to prevent the passage of moisture and the like through the bulkhead.

28. A light bar as set forth in claim 27 wherein said sealing member comprises a closed cell foam having a Shore 00 durometer in the range of 35–55 and an elongation of 100–250%.

29. A light bar as set forth in claim 27 wherein said foam is compressed between the walls of the bulkhead to provide a sealing fit between the foam and the walls.

30. A light bar as set forth in claim 29 wherein said bulkhead comprises an elongate member of an inverted U shape.

31. A method of making a light bar for emergency vehicles, said light bar comprising a relatively thin flat elongate base adapted for mounting thereon a plurality of electrical and mechanical components such as lamps, a siren and the circuitry therefor, said method comprising the steps of:

providing an array of holes in the base extending lengthwise of the base, said holes being of such number and so arrayed as to accommodate any one of a multiplicity of component configurations;

applying sealing means to the base over the holes to seal the holes; and mounting selected components on the base by threading a plurality of fasteners through said sealing means into specific holes in said array of holes for fastening said selected components to the base in a predetermined configuration, the other holes in the array remaining sealed by said sealing means.

32. A method as set forth in claim 31 wherein said sealing means comprises a a strip of sealing tape.

33. A method as set forth in claim 32 wherein said fasteners are self-tapping screws.

34. In a light bar comprising an elongate base, a dome over the base, and at least one lamp mounted on the base inside the dome, the improvement which comprises a stationary light filter attached to said base and spaced laterally from said lamp with respect to said base, said filter being positioned either rearwardly or forwardly of said lamp with respect to a vehicle when said light bar is attached to said vehicle transversely of the longitudinal axis of said vehicle, said filter comprising a transparent material tinted with a color to be imparted to light from said lamp, whereby light of said color is projected either rearwardly or forwardly of a vehicle to which said light bar is transversely attached.

35. An improved light bar as set forth in claim 34 wherein said dome is transparent and colorless.

36. An improved light bar set forth in claim 34 further comprising a second transparent filter attached to said base and spaced laterally of said lamp on the side of said lamp opposite the first filter.

37. An improved light bar as set forth in claim 36 wherein said second filter is tinted a color different from said first filter so that light of one color can be projected from said lamp forwardly of said vehicle and light of a different color can be projected from said lamp rearwardly of said vehicle.

38. An improved light bar as set forth in claim 34 wherein said filter is removably attached to said base and comprises a modular unit that it is interchangeable with other filters of the same or different color and is adapted to accommodate lamps of different configuration that are attached to said base.

39. An improved light bar as set forth in claim 38 wherein said filte is generally semi-cylindric in shape and is adapted to be mounted with its axis of curvature generally vertical, said filter having a radial flange at its lower end for mounting of the filter on said base via a fastener.

* * * * *